United States Patent
Sonoda

(10) Patent No.: US 9,741,097 B2
(45) Date of Patent: Aug. 22, 2017

(54) IMAGE PROCESSING DEVICE

(71) Applicant: SAMSUNG DISPLAY CO., LTD., Yongin-si, Gyeonggi-Do (KR)

(72) Inventor: Masatoshi Sonoda, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/001,938

(22) Filed: Jan. 20, 2016

(65) Prior Publication Data

US 2016/0217553 A1    Jul. 28, 2016

(30) Foreign Application Priority Data

Jan. 22, 2015    (JP) .................................. 2015-010532

(51) Int. Cl.
*G09G 5/00*      (2006.01)
*G06T 3/40*      (2006.01)
*G06T 5/20*      (2006.01)

(52) U.S. Cl.
CPC .......... *G06T 3/4053* (2013.01); *G06T 3/4007* (2013.01); *G06T 5/20* (2013.01)

(58) Field of Classification Search
CPC ........ G06T 3/4053; G06T 3/4007; G06T 5/20
See application file for complete search history.

(56) References Cited

FOREIGN PATENT DOCUMENTS

| JP | 06-225268 | 8/1994 |
|---|---|---|
| JP | 2007318647 | 12/2007 |
| JP | 2011-015186 | 1/2011 |
| JP | 2011-521342 | 7/2011 |
| JP | 5095860 | 9/2012 |
| JP | 2013-030977 | 2/2013 |

OTHER PUBLICATIONS

Takahashi et al., Video Signal Conversion Device, Jan. 20, 2011, JP 2011-015186.*

* cited by examiner

*Primary Examiner* — Martin Mushambo
(74) *Attorney, Agent, or Firm* — F. Chau & Associates, LLC

(57) ABSTRACT

Provided is an image processing device including a scaling unit configured to enlarge an input image represented by an input image signal to generate an enlarged image, a gain calculating unit configured to calculate a gain for enhancing the enlarged image for each target pixel of the enlarged image on a basis of the input image signal, and an adding unit configured to add, for each target pixel, a pixel value of the target pixel and the gain corresponding to the pixel value of the target pixel.

15 Claims, 11 Drawing Sheets

FIG. 2

| Memory | Number of columns | Necessary number of rows |
|---|---|---|
| Input line memory(18) | C | $T_U$ |
| Conversion line memory(20) | C | $U*T_U$ |
| Output line memory(22) | $U*C$ | $\max(U*T_U, T_E)$ |

FIG. 4

| Memory | Number of columns | Necessary number of rows |
|---|---|---|
| Input line memory(18) | 1920 | 7 |
| Conversion line memory(20) | 1920 | 14 |
| Output line memory(22) | 3840 | 14 |

| Memory | Number of columns | Necessary number of rows |
|---|---|---|
| Input line memory(110) | C | $\max(T_U, T_{E'})$ |
| Conversion line memory(112) | C | $U * T_U$ |

Input Line Memory(110)

FIG. 8

| Memory | Number of columns | Necessary number of rows |
|---|---|---|
| Input line memory(110) | 1920 | 7 |
| Conversion line memory(112) | 1920 | 14 |

IMAGE PROCESSING DEVICE

CROSS-REFERENCE TO RELATED APPLICATION

This U.S. non-provisional patent application claims priority under 35 U.S.C. §119 to Japanese Patent Application No. JP2015-010532, filed on Jan. 22, 2015, the entire contents of which are hereby incorporated by reference.

TECHNICAL FIELD

The present disclosure relates to an image processing device and corresponding method.

DISCUSSION OF RELATED ART

In the field of image processing, there are many cases where, when up-scaling, which is sometimes called "up-converting," is conducted on an input image signal, the resulting image signal loses precision. This is often because a relatively high band component (e.g., a component close to a Nyquist frequency) is reduced by converting a low-resolution image into a high-resolution image without adequately considering or addressing that the Nyquist frequency increases due to the increase in sampling frequency used by the up-scaling.

A technique was developed for up-scaling such an input image signal while substantially preventing degradation in quality of display of an image enlarged after the up-scaling. For example, Japanese Patent Application Laid-open Publication No. JP2011-015186A discloses a technique for up-scaling an input image signal and conducting an enhancement process on the image signal after the up-scaling.

When such a technique is used, since the enhancement process is conducted on a high band component after the up-scaling, the above-described degradation in quality of display due to loss of precision, which is caused by the up-scaling, may be substantially prevented. Here, in a case where the enhancement process is conducted after up-scaling, for example, there might be one memory for maintaining an input image represented by an input image signal and another memory for maintaining an enlarged image represented by an image signal after the up-scaling. The one memory for maintaining the input image would be used for performing the up-scaling, and the other memory for maintaining the enlarged image would be used for performing the enhancement process.

When the enhancement process is performed after the up-scaling, separate memories for maintaining the input image and the enlarged image would generally be used. In addition, for example, since the resolution of an image enlarged after up-scaling may be relatively high due to increasing resolutions of modern display devices, the capacity of the other memory used for maintaining the enlarged image to conduct the enhancement process would be correspondingly larger. Thus, the minimum memory capacity using such a technique would be large enough to maintain the enlarged image during its enhancement process.

SUMMARY

The present disclosure provides an image processing device and method with relaxed memory requirements capable of up-scaling an input image while substantially preventing degradation in the quality of display of an enlarged output image. An embodiment of the inventive concept provides an image processing device including: a scaling unit configured to enlarge an input image represented by an input image signal to generate an enlarged image; a gain calculating unit configured to calculate a gain for emphasizing or enhancing the enlarged image for each target pixel of the enlarged image on a basis of the input image signal; and an adding unit configured to add, for each target pixel, a pixel value of the target pixel and the gain corresponding to the pixel value of the target pixel.

According to this configuration, it is possible to up-scale an image represented by an input image signal and in addition, to add a pixel value of an enlarged image and a gain corresponding to the enlarged image to enhance the enlarged image. Accordingly, the image represented by the input image signal may be up-scaled and enhanced, while degradation in the quality of display of the up-scaled and enhanced image may be substantially prevented. In addition, various effects to be described later may be obtained according to this configuration.

In an embodiment, the gain calculating unit may calculate the gain to compensate for phase deviation between the input image signal and the enlarged image signal. In an embodiment, the gain calculating unit may calculate the gain by a filtering process.

In an embodiment, the gain calculating unit may calculate the gain through the filtering process using a plurality of filters corresponding to an enlargement ratio of the scaling unit with respect to the input image.

In an embodiment, the scaling unit and gain calculating unit and are each connected to separate inputs of the adding unit, but the gain calculating unit is not connected to any output of the scaling unit.

In an embodiment of the inventive concept, an image processing method includes: enlarging an input image represented by an input image signal to generate an enlarged image; calculating a gain for emphasizing or enhancing the enlarged image for each target pixel of the enlarged image on a basis of the input image signal; and adding, for each target pixel, a pixel value of the target pixel with the gain corresponding to the pixel value of the target pixel.

According to the method, it is possible to up-scale an image represented by an input image signal and in addition, to add a pixel value of an enlarged image and a gain corresponding to the enlarged image to enhance the enlarged image. Accordingly, the image represented by the input image signal may be up-scaled and enhanced, while degradation in the quality of display of the image may be substantially prevented. In addition, various effects to be described later may be obtained according to this method.

In an embodiment of the inventive concept, an image processing method includes enlarging an input image represented by an input image signal to generate an enlarged image represented by an enlarged image signal; calculating a gain for enhancing the enlarged image for each target pixel of the enlarged image, respectively, based on the input image signal; and adding, for each target pixel of the enlarged image, the gain for the target pixel to a pixel value of the target pixel with the gain corresponding to the pixel value of the target pixel, respectively. In an embodiment, the image processing method further includes calculating the gain to compensate for phase deviation between the input image signal and the enlarged image signal.

In an embodiment, the image processing method includes calculating the gain by a filtering process. In an embodiment, the image processing method further includes calculating the gain through the filtering process using a plurality of filters corresponding to an enlargement ratio with respect to the input image, where filter coefficients of the plurality of filters are different from each other.

In an embodiment, the image processing method includes selecting at least one of the plurality of filters based on relative positions of the target pixel and reference pixels corresponding to the target pixel, and calculating the gain by using the selected filter. In an embodiment, the image processing method further includes selecting a filter with a distance from a center of an impulse response of the filter to a center of the reference pixels corresponding to the target pixel being substantially equal to a distance from a center of the target pixel to the center of reference pixels corresponding to the target pixel. In an embodiment, the image processing method includes calculating the gain for enhancing the enlarged image independently of enlarging the input image.

In an embodiment of the inventive concept, a program is provided for allowing a computer to function as a scaling means for enlarging an input image represented by an input image signal to generate an enlarged image; a gain calculating means for calculating a gain for emphasizing or enhancing the enlarged image for each target pixel of the enlarged image on a basis of the input image signal; and an adding means for adding, for each target pixel, a pixel value of the target pixel and the gain corresponding to the pixel value of the target pixel.

According to the program, the image represented by the input image signal may be up-scaled and enhanced, while degradation in the quality of display of the image may be substantially prevented. In addition, various effects to be described later may be obtained according to this program.

In an embodiment of the inventive concept, a software product for use in an image processing device having a processor and a memory includes computer executable instructions that, when executed by the processor, cause the device to enlarge an input image represented by an input image signal from the memory to generate an enlarged image represented by an enlarged image signal; calculate a gain for enhancing the enlarged image for each target pixel of the enlarged image, respectively, based on the input image signal from the memory; and add, for each target pixel of the enlarged image, the gain for the target pixel to a pixel value of the target pixel, respectively.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. Like reference indicia may denote like elements throughout the drawings, in which:

FIG. 2 is an explanatory conceptual diagram illustrating an outline of memory capacity required by the image processing device in which an enhancement process is performed after up-scaling;

FIG. 4 is an explanatory conceptual diagram illustrating a concrete example of memory capacity required by the image processing device in which an enhancement process is performed after up-scaling;

FIG. 8 is an explanatory conceptual diagram illustrating a concrete example of memory capacity required by the image processing device according to an exemplary embodiment of the inventive concept;

DETAILED DESCRIPTION

Figure 1:
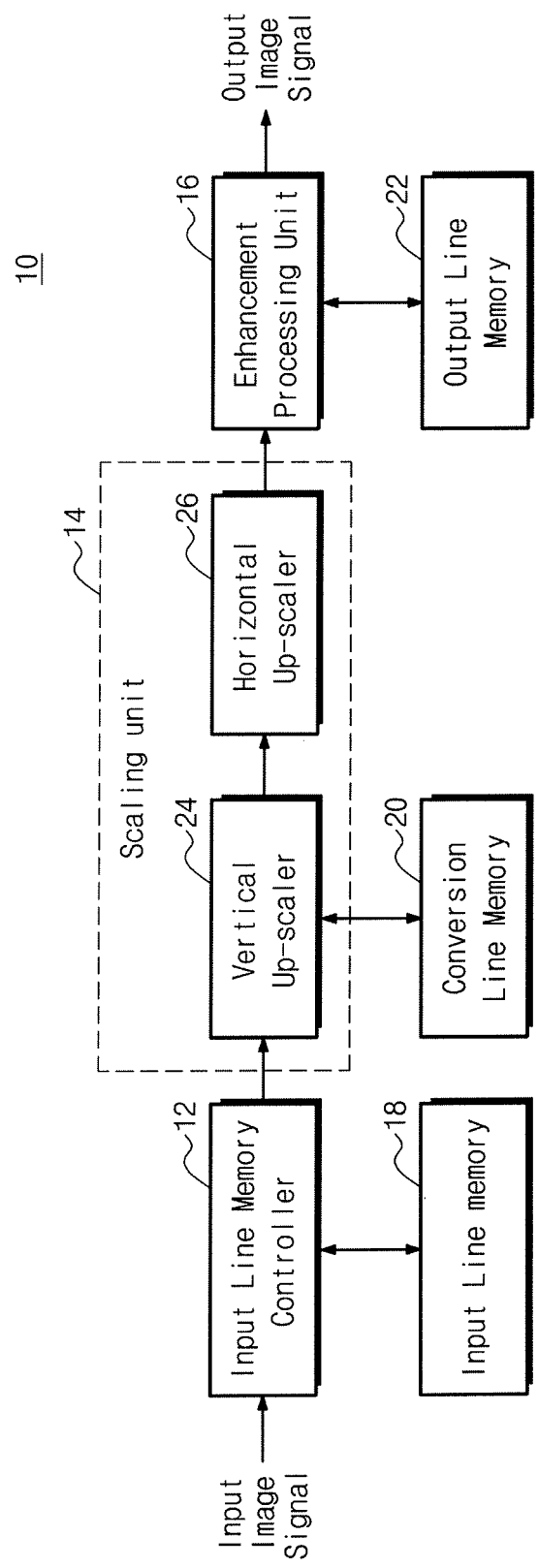
FIG. 1 is a schematic block diagram illustrating an exemplary configuration of an image processing device in which an enhancement process is performed after up-scaling.

Exemplary embodiments of the inventive concept will be described with reference to the accompanying drawings. The inventive concept may, however, be embodied in different forms and should not be construed as limited to the exemplary embodiments set forth herein. Rather, these embodiments are provided so that this disclosure will be thorough and complete, and will fully convey the scope of the inventive concept to those skilled in the art.

In the description that follows, the singular forms "a" and "the" are intended to include the plural forms as well, unless the context clearly indicates otherwise. "Coupled to" means directly or indirectly coupled to, unless the context clearly indicates otherwise. To avoid overlapping description, like reference numerals may refer to like elements having substantially like functional configurations.

Hereinafter, exemplary embodiments of the inventive concept will be described in detail with reference to the accompanying drawings. For an image display according to an embodiment of the inventive concept, an image processing method according to an embodiment of the inventive concept will be described where an image processing device according to an embodiment of the inventive concept performs a process according thereto.

In an example where the enhancement process is performed after up-scaling, memories for respectively maintaining the input image and the enlarged image are used for comparative purposes. Prior to describing an image processing method according to an exemplary embodiment of the inventive concept, a basic technique for conducting an enhancement process after up-scaling is described.

FIG. 1 is a block diagram illustrating an exemplary configuration of an image processing device 10 according to a basic technique in which an enhancement process is performed after up-scaling.

The image processing device 10 may include, for example, an input line memory controller 12 disposed to receive an input image signal, an input line memory 18 connected to the memory controller 12, a scaling unit 14 connected to the memory controller 12, a conversion line memory 20 connected to the scaling unit 14, an enhancement processing unit 16 connected to the scaling unit 14, and an output line memory 22 connected to the processing unit 16. The scaling unit 14 may include, for example, a vertical up-scaler 24 connected to the input line memory controller 12 and the conversion line memory 20. and a horizontal up-scaler 26 connected between the vertical up-scaler 24 and the enhancement processing unit 16.

The image processing device 10 may be configured with, for example, a processor such as a central processing unit (CPU), or various processing circuits, and may include a controller (not illustrated) for controlling the entirety thereof. In a case including the controller (not illustrated), the controller in the image processing device 10 may play a role of at least one of the input line memory controller 12, the scaling unit 14, or the enhancement processing unit 16.

The input line memory controller 12 controls, for example, when to write and read an input image signal to and from the input line memory 18. The scaling unit 14 conducts an up-scaling process on image data corresponding to the input image signal read from the input line memory 18. The scaling unit 14 includes, for example, a vertical up-scaler 24 for up-scaling an image in a vertical direction and a horizontal up-scaler 26 for up-scaling an image in a horizontal direction. The vertical up-scaler 24 and the horizontal up-scaler 26 respectively scale an image in the vertical and horizontal directions by a filtering process with, for example, a finite impulse response (FIR) filter or the like.

The enhancement processing unit 16 performs an enhancement process on an image signal received from the scaling unit 14. The enhancement processing unit enhances an image represented by the image signal received from the scaling unit 14 by adding, for example, an image represented by the image signal received from the scaling unit 14 and a gain (e.g., an alternating current (AC) component of the image signal) calculated from the corresponding image to pixels. Here, the enhancement processing unit 16 calculates the gain by a filtering process with an arbitrary filter, such as a band pass filter (BPF), used for an enhancement process on the image signal received from the scaling unit 14.

The input line memory 18, the conversion line memory 20, and the output line memory 22 are recording media for storing image data, which are provided in the image processing device 10. The input line memory 18 stores, for example, row data that is a processing target in the input image input to the vertical up-scaler 24. In addition, the conversion line memory 20 stores image data corresponding to an image processed by the vertical up-scaler 24, and the horizontal up-scaler 26 may process, for example, the image data stored in the conversion line memory 20. In addition, the output line memory 22 stores image data corresponding to the image processed by the horizontal up-scaler 26, and the enhancement processing unit 16 processes, for example, image data stored in the output line memory 22. Hereinafter, a description will be provided about a memory capacity required for a process in the image processing device 10 illustrated in FIG. 1.

FIG. 2 is an explanatory diagram illustrating an outline of memory capacity required by the image processing device according to the basic technique in which an enhancement process is performed after up-scaling. When it is assumed that the number of pixels of the input image is "L rows×C columns", an up-scale ratio is "a multiple of U" (where U>1), the number of filter taps in the vertical and horizontal up-scalers 24 and 26 is "$T_U$", and the number of vertical filter taps in the enhancement processing unit 16 is "$T_E$", the memory capacity required for a process in the image processing device 10 is represented as shown in FIG. 2. In FIG. 2, the reasons that the required numbers of rows are as calculated are as follows.

Input line memory 18: for maintaining and providing ($T_U$ rows) to the vertical up-scaler 24.

Conversion memory 20: for maintaining an output (e.g., $U*T_U$ rows) from the vertical up-scaler 24 and providing as an input (e.g., $T_U$ rows) for the horizontal up-scaler 26.

Output line memory 22: for maintaining an output (i.e. $U*T_U$ rows) from the horizontal up-scaler 26 and providing as an input (e.g., $T_E$ rows) for the enhancement processing unit 16.

The memory capacity required for a process in the image processing device 10 may be calculated by using the table in FIG. 2, and the memory capacity may be expressed in units of pixels per the following Equation (1).

$$C \times T_U + C \times U \times T_U + U \times C \times \max(U \times T_U, T_E) \qquad \text{EQN. (1)}$$

where, for a third item of Equation (1), considering a case where "$U \times T_U \geq T_E$" and a case where "$U \times T_U < T_E$", Equation (1) is expressed as the following Equation (2).

$$C \times \{T_U \times (1+U+U^2)\} \ (U \times T_U \geq T_E)$$

$$C \times \{T_U \times (1+U) + U \times T_E\} \ (U \times T_U < T_E) \qquad \text{EQN. (2)}$$

From Equation (2), it may be seen that the memory capacity required by the image processing device 10 increases according to increases in up-scale ratio U and number $T_E$ of filter taps of the enhancement processing unit 16.

This represents a concrete example of memory capacity required for a process in the image processing device 10. Hereinafter, a case is exemplified where the image processing device 10 up-scales (e.g., converts a resolution from) a full HD image (e.g., an image having the number of pixels of 1920 columns×1080 rows) to an ultra HD image (e.g., an image having the number of pixels of 3840 columns×2160 rows) by using a double up-scaler having 7 taps, and then conducts an enhancement process with a 9-tap filter.

Figure 3:
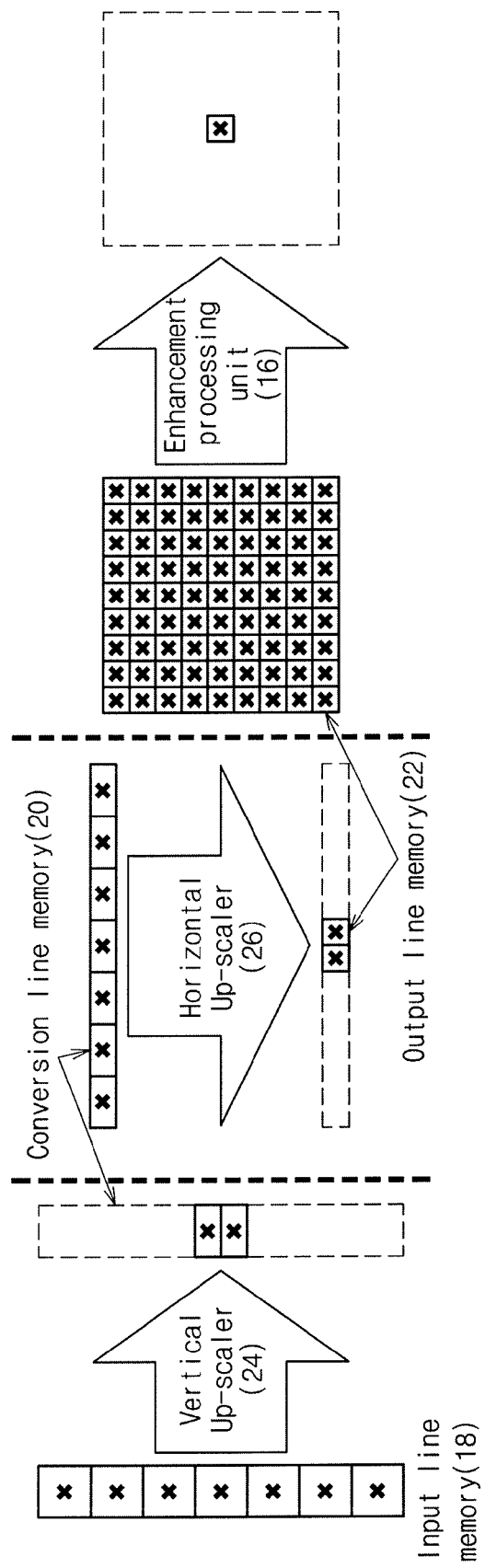
FIG. 3 is an explanatory conceptual diagram illustrating an outline of a process conducted in the image processing device in which an enhancement process is performed after up-scaling.

FIG. 3 is an explanatory diagram illustrating an outline of a process conducted in the image processing device according to the basic technique in which an enhancement process is conducted after up-scaling, and schematically illustrates processes of the vertical up-scaler 24, horizontal up-scaler 26, and enhancement processing unit 16.

Referring to FIG. 3, the conversion line memory 20 requires a capacity of the same width as that of the input line memory 18 and the same number of rows as the number $T_U$ of taps of the horizontal up-scaler 26 to supply data to the horizontal up-scaler 26. In addition, the output line memory 22 requires a capacity of both the width and the number of rows equal to or greater than the number $T_E$ of filter taps with respect to the input line memory 18, to supply data to the enhancement unit 16.

FIG. 4 is an explanatory diagram illustrating a detailed example of memory capacity required by the image processing device 10 according to the basic technique in which an enhancement process is performed after up-scaling.

For the image processing device 10 of FIG. 3, the memory capacity necessary for the process is shown in FIG. 4 from C=1920, U=2, $T_U$=7, and $T_E$=9, by using the table in FIG. 2.

In addition, from FIG. 4 and Equation (2), the number of memory bits necessary for the process in the image processing device 10 is expressed as the following Equation (3).

$$1920 \times \{7 \times (1+2+22)\} = 94080 \qquad \text{EQN. (3)}$$

Here, the memory capacity necessary for up-scaling in the image processing device 10 is for image data of 40320 pixels corresponding to the input line memory 18 and conversion line memory 20. However, as expressed in Equation (3), the process of the image processing device 10 requires a memory capacity for maintaining image data of 94080−40320=53760 pixels only for the enhancement process after up-scaling. Therefore, like the image processing device 10, in a case where the enhancement process is conducted after up-scaling, it is necessary to double the size of hardware memory for maintaining the image data to conduct the enhancement process after up-scaling.

It may be seen from Equation (1) that as the up-scale ratio U is increased, a ratio of additional data corresponding to the third term in Equation (1) increases exponentially. Accordingly, as in the image processing device 10, the size of hardware memory increases in a case where the enhancement process is conducted after up-scaling. In addition, like the image processing device 10 in a case where the enhancement process is conducted after up-scaling, there may be challenges in designing the up-scaler in a view of image processing performance.

Figure 5:
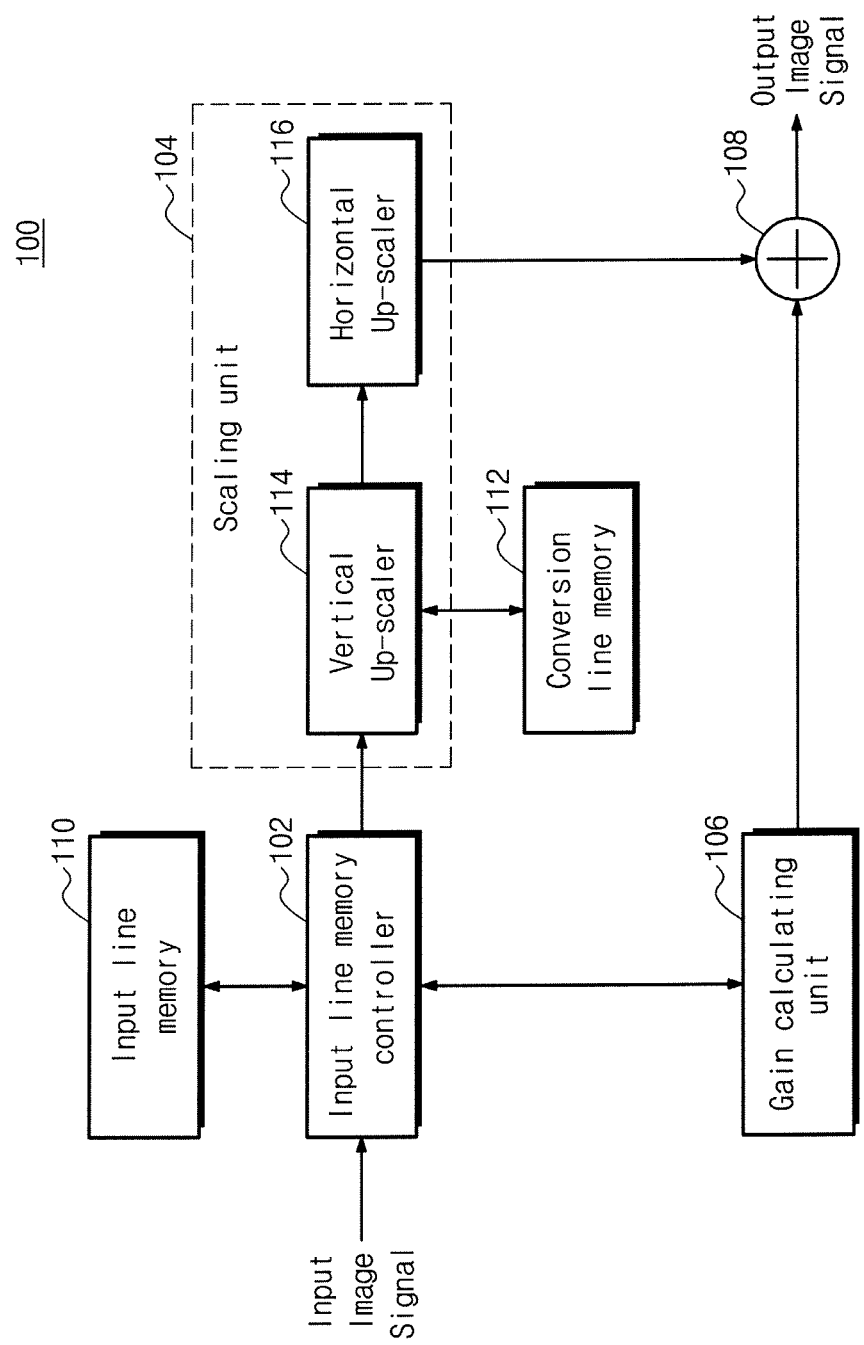
FIG. 5 is a schematic block diagram illustrating an exemplary configuration of an image processing device according to an exemplary embodiment of the inventive concept.

As shown in FIG. 5, an image processing device in accordance with an exemplary embodiment of the present inventive concept is indicated generally by the reference numeral 100. Its method of operation will now be described. If the image processing device 10 of FIG. 1 and its corresponding method, where the enhancement process is conducted after up-scaling, use relatively larger memory and hardware, the image processing device 100 of FIG. 5 and its corresponding method may use relatively smaller memory and hardware.

Here, the image processing device according to an exemplary embodiment of the inventive concept applies a scaling process to an input image signal and enlarges an input image by this scaling process to create an enlarged image. This image processing device calculates a gain for emphasizing or enhancing the enlarged image, as enlarged by the scaling process, for each target pixel of the enlarged image on the basis of the input image signal, such as by using a gain calculating process. In addition, this image processing device adds a pixel value and the gain corresponding to the pixel value of the image signal for each target pixel, such as by using an adding process.

The image processing device according to an embodiment of the inventive concept conducts the above-described scaling process, gain calculating process, and adding process as processes according to an image processing method according to an embodiment of the inventive concept. Here, as the image represented by the input image signal according to an embodiment of the inventive concept, a still image or video frame may be exemplified. In addition, as the input image signal according to an embodiment of the inventive concept, a digital signal or an analog signal may be exemplified. When the input image signal is an analog signal, an image processing device according to an embodiment of the inventive concept may process the analog signal or properly convert the analog signal into a digital signal by using an analog-to-digital converter (ADC) or the like to produce the digital signal.

In the image processing device according to this exemplary embodiment of the inventive concept, since the gain calculating process and adding process are conducted, and the enlarged image, which is the result of the scaling process, is enhanced, degradation in quality of display due to loss of precision may be prevented. Accordingly, the image processing device according to embodiments of the inventive concept may up-scale and enhance the image represented by the input image signal and substantially prevent degradation in quality of display of the resulting output image.

In addition, in an image processing device according to an exemplary embodiment of the inventive concept, a gain, which is the result of the gain calculating process, is added to a pixel value of each target pixel of the enlarged image that results from the scaling process. Accordingly, in this image processing device, since the output line memory 22 provided in, for example, the image processing device 10 as illustrated in FIG. 1 is not necessary, the image processing device 100 of FIG. 5 may have smaller-sized hardware than the image processing device 10 that conducts the enhancement process after up-scaling.

In addition, in the image processing device 100 according to the embodiment of the inventive concept, unlike the image processing device 10 illustrated in FIG. 1, the enhancement process is not conducted for an image signal (hereinafter, "enlarged image signal") substantially after the scaling process, but rather substantially in parallel with it. Accordingly, in the image processing device according to the embodiment of the inventive concept, a level of difficulty in designing the up-scaler or adjusting performance may be reduced.

A description will now be provided for an image processing device according to an exemplary embodiment of the inventive concept in which an image processing method according to an embodiment of the inventive concept may be executed.

FIG. 5 is a block diagram illustrating an exemplary configuration of an image processing device 100 according to an exemplary embodiment of the inventive concept. In FIG. 5, an image signal, obtained after a process is conducted according to the image processing method of an embodiment of the inventive concept, is shown as "an output image signal."

The image processing device 100 includes, for example, an input line memory controller 102 disposed to receive an input image signal, an input line memory 110 coupled to the memory controller 102, a scaling unit 104 coupled to the memory controller 102, conversion line memory 112 coupled to the scaling unit 104, a gain calculating unit 106 coupled to the memory controller 102, and an adding unit 108 coupled to each of the scaling unit 104 and the gain calculating unit 106, where the adding unit 108 is disposed to send an output image signal. Here, the scaling unit 104 may include a vertical up-scaler 114 coupled to each of the memory controller 102 and the conversion line memory 112, and a horizontal up-scaler 116 coupled between the vertical up-scaler 114 and the adding unit 108.

In addition, the image processing device 100 may be configured of, for example, a processor such as a central processing unit (CPU), or various processing circuits, and may include a general controller (not illustrated) for controlling the entirety thereof. In a case including the general controller (not illustrated), the general controller for the image processing device 100 may play a role of at least one of the input line memory controller 102, the scaling unit 104, the gain calculating unit 106, or the adding unit 108.

In addition, it shall be understood that at least one of the input line memory controller 102, scaling unit 104, gain calculating unit 106, or adding unit 108 may be realized with a processing circuit (e.g., a dedicated processing circuit, general purposed processing circuit, or the like) separate from the general controller. In addition, a process conducted in at least one of the input line memory controller 102, scaling unit 104, gain calculating unit 106, or adding unit 108 may be realized with a program (e.g., software) executed by a processor.

The input line memory controller 102 controls, for example, when to write and read an input image signal to and from the input line memory 110. In addition, in the image processing device 100, another element such as the general controller, scaling unit 104, or gain calculating unit 106 may play a role of the input line memory controller 102.

The scaling unit 104 plays a role for dominantly conducting the scaling process and enlarging an input image represented by the input image signal. The scaling unit 104 enlarges the input image by conducting a process according to up-scaling of image data corresponding to, for example, the input image signal read from the input line memory 110.

The scaling unit 104 includes, for example, a vertical up-scaler 114 for up-scaling an image in a vertical direction, and a horizontal scaler 116 for up-scaling an image in a horizontal direction. The vertical up-scaler 114 and the horizontal up-scaler 116 respectively up-scale the image in the vertical and horizontal directions by a filter process with, for example, an FIR filter or the like.

The gain calculating unit 106 dominantly conducts the gain calculating process and calculates a gain, which is for emphasizing or enhancing the enlarged image (e.g., an image enlarged by the scaling unit 104) for each target pixel of the enlarged image on the basis of the input image signal. The gain calculating unit 106 conducts a process on the image data corresponding to, for example, the input image signal read from the input line memory 110, and calculates the gain for each target pixel of the enlarged image.

Here, the gain calculating unit 106 may calculate the gain by, for example, a filtering process. In detail, the gain calculating unit 106 may calculate the gain by, for example, a filtering process using a plurality of filters. Filter coefficients of the plurality of filters may correspond to an enlargement ratio of the scaling unit 104 for the input image, and may be different from each other.

In addition, in the gain calculating process, a gain for emphasizing or enhancing the enlarged image, namely, a gain of the enlarged image beyond up-scaling the input image, is calculated based on the input image signal. Therefore, an input and output of the gain calculating unit 106 may have different phases. Here, the gain calculating unit 106 calculates a gain to compensate for phase deviation between the input image signal and the enlarged image signal (e.g., the image signal beyond the process in the scaling unit 104).

The adding unit 108 plays a role for dominantly conducting the adding process, and adds a pixel value of the enlarged image to a corresponding gain for each target pixel. The adding unit 108 includes, for example, an adder.

In addition, the adding unit 108 outputs an image signal (e.g., an output image signal) on which the image processing method according to an embodiment of the inventive concept has been performed. The image signal output from the adding unit 108 may be delivered to a display device, displayed on a display screen as an image, and also recorded in a recording medium as image data. A display control on a display screen or a recording control in a recording medium is conducted by, for example, a controller (not illustrated) or external device.

The input line memory 110 and the conversion line memory 112 are recording media for storing image data, and are provided in the image processing device 100. As illustrated in FIG. 5, the image processing device 100 does not include the output line memory 22 provided in the image processing device 10 illustrated in FIG. 1.

The input line memory 110 plays a role like the input line memory 18 illustrated in FIG. 1, and processing target row data of the input image, which becomes, for example, an input of the vertical up-scaler 114 and gain calculating unit 106, is recorded in the input line memory 110.

In addition, the conversion line memory 112 plays a role like the conversion line memory 20 illustrated in FIG. 1, image data corresponding to an image processed by the vertical up-scaler 114 is recorded in the conversion line memory 112, and the horizontal up-scaler 116 processes, for example, image data recorded in the conversion line memory 112.

The image processing device 100 conducts the scaling process, the gain calculating process, and the adding process according to the image processing method of the embodiment of the inventive concept by, for example, a configuration illustrated in FIG. 5.

Accordingly, the image processing device 100 up-scales an image represented by an input image signal by, for example, the configuration illustrated in FIG. 5, to prevent degradation in quality of display of the up-scaled and enhanced image.

In addition, the image processing device 100 may show, by the configuration illustrated in FIG. 5, the same effect as shown by the process executed according to the image processing method according to the embodiment of the inventive concept. In addition, the configuration of the image processing device according to this embodiment is not limited to the configuration illustrated in FIG. 5, and may have, for example, an arbitrary configuration capable of conducting a process according to the image processing method of an embodiment of the inventive concept.

Figures 6, 7:
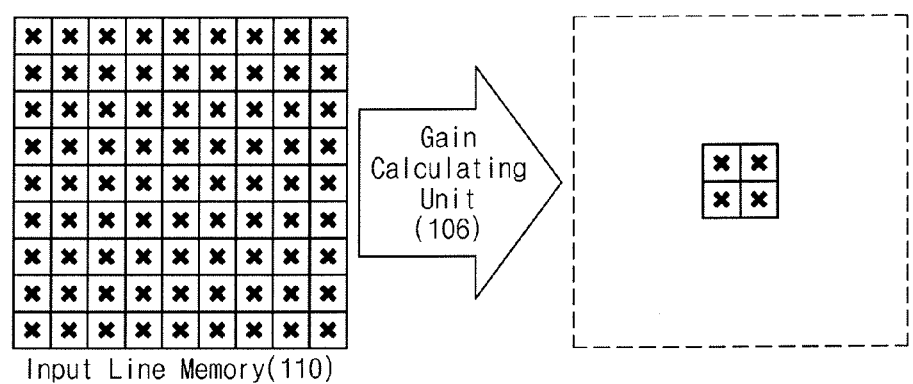
FIG. 6 is an explanatory conceptual diagram illustrating an outline of memory capacity required by the image processing device according to an exemplary embodiment of the inventive concept.
FIG. 7 is an explanatory conceptual diagram illustrating an outline of a process conducted in the image processing device according to an exemplary embodiment of the inventive concept.

The memory capacity used for a process in the image processing device 100 will now be described. FIG. 6 is an explanatory diagram illustrating an outline of memory capacity used by the image processing device 100 according to this embodiment.

When it is assumed that the number of pixels of the input image is "L rows×C columns", an up-scale ratio is "a multiple of U" (where U>1), the number of filter taps in the vertical and horizontal up-scalers 114 and 116 is "$T_U$", and the number of vertical filter taps in the gain calculating unit 106 is "$T_E$", the memory capacity required for a process in the image processing device 100 is represented as FIG. 6. In FIG. 6, the reasons why the numbers of necessary rows are as calculated are as the follows.

Input line memory 110: for processing ($T_U$ rows) in the vertical up-scaler 114 and processing ($T_E$ rows) in the gain calculating unit 106.

Conversion memory 112: for maintaining an output (e.g., U*$T_U$ rows) of the vertical up-scaler 114 and making as an input (e.g., $T_U$ rows) of the horizontal up-scaler 116.

The memory capacity required for a process in the image processing device 100 may be calculated by using FIG. 6 and the memory capacity may be expressed in units of pixels per the following Equation (4).

$$C \times \max(T_U, T_{E'}) + C \times U \times T_U \qquad \text{EQN. (4)}$$

where, according to magnitude relation between "$T_U$" and "$T_{E'}$" in a first term of Equation (4), Equation (4) may be expressed as the following Equation (5).

$$C \times \{T_U \times (1+U)\} \ (T_U \geq T_{E'})$$
$$C \times \{T_{E'} + U \times T_U\} \ (T_U < T_{E'}) \qquad \text{EQN. (5)}$$

Comparing Equations (5) and (2), it may be seen that in the image processing device 100, dependence on a required memory capacity to the up-scale ratio U is reduced, and in the image processing device 100, particularly when the number of taps $T_{E'}$ is limited to the number of taps $T_E$ or smaller, the memory capacity may be reduced by the entire capacity of the output line memory 22 illustrated in FIG. 1. Here, when considering a frequency characteristic, the number of taps $T_{E'}$ may be limited to the number of taps $T_E$ or smaller.

A concrete example of memory capacity required for a process in the image processing device 100 will be described. Hereinafter, a case will be exemplified where the image processing device 100 up-scales (e.g., converts a resolution from) a full HD image (e.g., an image having the number of pixels of 1920 columns×1080 rows) to an ultra HD image (e.g., an image having the number of pixels of 3840 columns×2160 rows) by using a double up-scaler having 7 taps through the scaling unit 104. In addition, hereinafter, a case will be exemplified where the image processing device 100 calculates, through the gain calculating unit 106, a gain corresponding to a pixel position of the ultra HD image by using a 5-tap filter with respect to the full HD image.

Here, processes by the vertical up-scaler 114 and horizontal up-scaler 116 configuring the scaling unit 104 may be substantially identical to those by, for example, the vertical up-scaler 24 and horizontal up-scaler 26 illustrated in FIG. 3. In addition, in the image processing device 100, the enhancement processing unit 16 illustrated in FIG. 3 is not used and the gain calculating unit 106 conducts a process different from the process of the enhancement processing unit 16.

FIG. 7 is an explanatory diagram illustrating an outline of a process conducted in the image processing device 100, and schematically illustrates a process in the gain calculating unit 106.

As expressed in Equation (5), the number of rows of the input line memory 110 is required as many as a greater one of the numbers of taps of the vertical up-scaler 114 and the gain calculating unit 106, but the conversion line memory 112 may be substantially identical to the conversion line memory 20 illustrated in FIG. 1. In addition, as illustrated in FIG. 5, since an output of the vertical up-scaler 116 and an output of the gain calculating unit 106 are added to form a pixel value of an output image signal, the image processing device 100 does not require the output line memory 22 provided in the image processing device 10 illustrated in FIG. 1.

FIG. 8 is an explanatory diagram illustrating an outline of memory capacity required by the image processing device 100 according to an exemplary embodiment.

The memory capacity required by the image processing device 100 is illustrated in FIG. 8 from that C=1920, U=2, $T_U$=7, and $T_E$=5, by using parameters illustrated in FIG. 6.

In addition, from FIG. 8 and Equation (5), the number of memory bits necessary for the process in the image processing device 100 is expressed as the following Equation (6).

$$1920 \times \{7 \times (1+2)\} = 40320 \qquad \text{EQN. (6)}$$

Comparing Equations (6) and (3), it may be seen that the memory capacity for the image processing device 100 of FIG. 5 to maintain image data is for 40320 pixels corresponding to the memory capacity necessary for up-scaling according to an exemplary embodiment of the inventive concept, while the memory capacity for the image processing device 10 of FIG. 1 to maintain image data is for 53760 pixels according to the basic technique.

Accordingly, the image processing device 100 may have hardware of reduced size relative to the image processing device 10 according to the basic technique with which an enhancement process is performed substantially after up-scaling.

A method for realizing the process in the gain calculating unit 106 will be exemplified, where the gain calculating unit 106 calculates a gain corresponding to an enlarged image by a filtering process with a filter having a frequency characteristic that is substantially close to that of a filter used in the enhancement processing unit 16 illustrated in FIG. 1.

In addition, hereinafter, a case is exemplified where an input image signal representing a full HD input image is input to the image processing device 100 or image processing device 10 to be up-scaled to an ultra HD image signal. In other words, the image is up-scaled twice in each of the vertical and horizontal directions.

In addition, hereinafter, for convenience of explanation, a case is exemplified where the gain calculating unit 106 conducts a process by using a one-dimensional filter. Here, enlargement that enables the process using the one-dimensional filter to be applied to a two-dimensional image may be realized by, for example, consecutively applying an identical filter in the vertical and horizontal directions of the image or by rotating coefficients of the one-dimensional filter on a two-dimensional plane.

Figure 9:
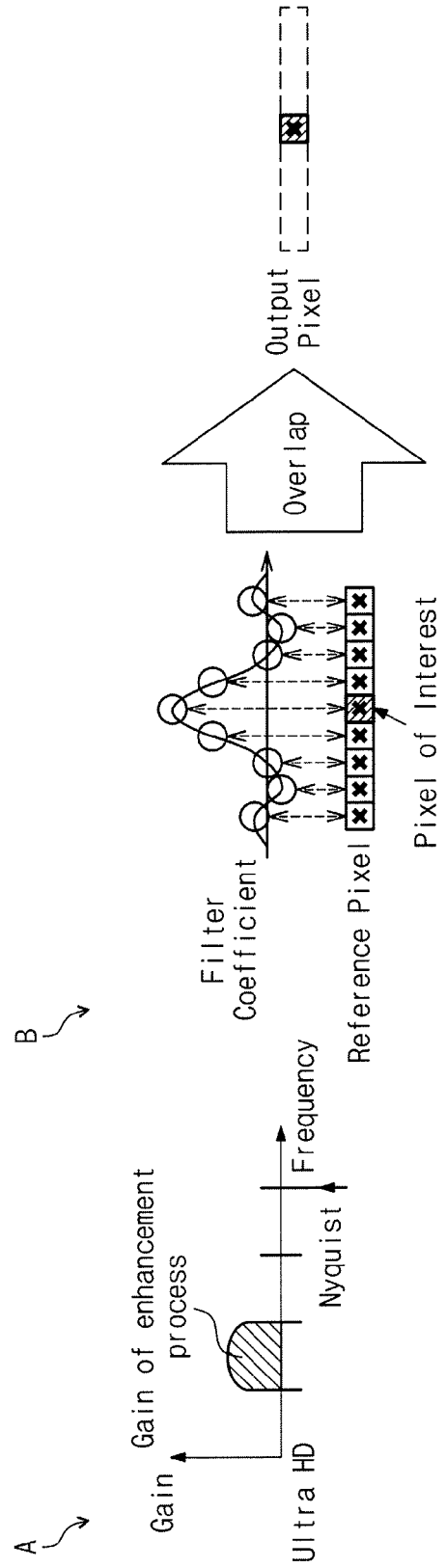
FIG. 9 is an explanatory conceptual diagram illustrating an exemplary frequency characteristic in the enhancement processing unit of the image processing device in which an enhancement process is performed after up-scaling.

First, a process is exemplified in the enhancement processing unit 16 of the image processing device 10 according to the basic technique in which the enhancement process is conducted substantially after the up-scaling. FIG. 9 is an explanatory diagram illustrating an exemplary frequency characteristic in the enhancement processing unit 16 of the image processing device 10 according to the basic technique in which an enhancement process is performed substantially after up-scaling. Hereinafter, it is assumed that the enhancement processing unit 16 of the image processing device 10 illustrated in FIG. 1 has a frequency characteristic illustrated in FIG. 9.

FIG. 9, reference letter A represents an example of an amplitude characteristic of the enhancement processing unit 16, and represents an example in which for enhancement, the enhancement processing unit 16 is configured of a band pass filter having a gain in a frequency band smaller than a half of a Nyquist frequency of the ultra HD image beyond the up-scaling. A band pass filter having the amplitude characteristic represented in FIG. 9 corresponds to a band pass filter giving a gain to a signal having a frequency slightly smaller than a Nyquist frequency of a full HD image before the up-scaling.

FIG. 9, reference letter B represents an example of a behavior of a filter relating to a phase characteristic of the enhancement processing unit 16. To process the enlarged image that is up-scaled to the ultra HD image, filter coefficients of a filter of the enhancement processing unit 16 have a bilaterally symmetric shape with respect to a target pixel and are overlapped with pixel values. Accordingly, in the process of the enhancement processing unit 16, a phase of the target pixel becomes a phase of an output pixel without change.

Here, for FIG. 9, reference letter B, a line of filter coefficient parts is a continuous functional approximation of the filter coefficients. The continuous function of filter coefficients are obtained by, for example, upsampling the filter coefficients 1000 times by zero padding and overlapping the upsampled result with a normalized sine cardinal or "sinc" function, also known as the sampling function, sampled at 1/1000 on a time axis. As known in the art, this function may be used for reconstructing the original continuous band-limited signal from uniformly spaced samples of that signal.

A filter configuring the gain calculating unit 106 may have a substantially identical frequency characteristic to that of the enhancement processing unit 16 of the image processing device 10 according to the basic technique illustrated in FIG. 9. The exemplary process in the gain calculating unit 106 of FIG. 5 differs from the process in the enhancement processing unit 16 illustrated in FIG. 1 in that a reference pixel in the process of the gain calculating unit 106 is a full HD image before up-scaling rather than an ultra HD image beyond up-scaling. Here, the gain calculating unit 106 obtains filter coefficients of a filter having a substantially identical frequency characteristic to that of the enhancement processing unit 16 by matching or combining an impulse response of the enhancement processing unit 16 illustrated in FIG. 1 with a pixel position of the full HD image before up-scaling to perform sampling and correction.

In addition, as described above, since the gain calculating unit 106 calculates a gain of the image enlarged beyond up-scaling from the input image to enhance the enlarged image, the input and output of the gain calculating unit 106 may be different. Accordingly, the filter coefficients of the filter in the gain calculating unit 106 are determined to compensate for phase deviation between the input image signal and enlarged image signal.

Figure 10:
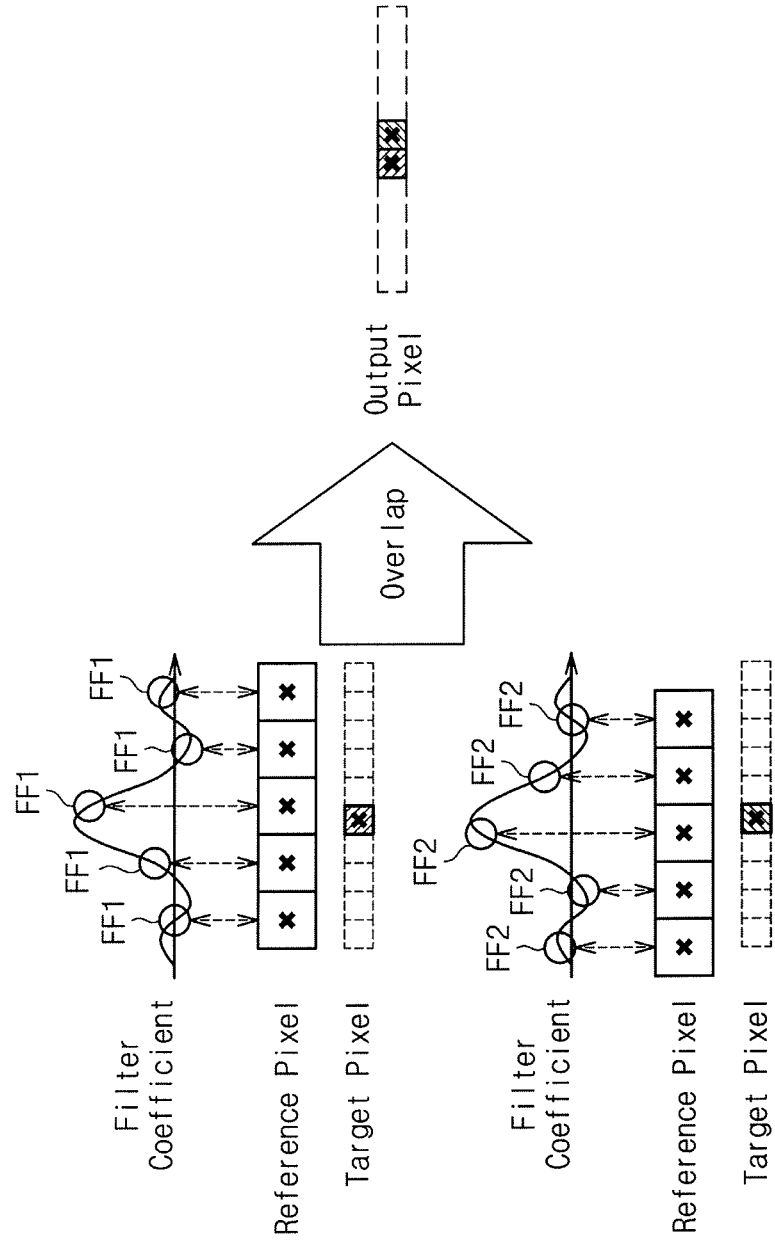
FIG. 10 is an explanatory conceptual diagram illustrating an outline of a process conducted in the image processing device according to an exemplary embodiment of the inventive concept.

FIG. 10 is an explanatory diagram illustrating an outline of a process conducted in the image processing device 100 according to an embodiment illustrating an exemplary spatial relation of a reference pixel of an input image with respect to a target pixel corresponding to a gain output from the gain calculating unit 106. In FIG. 10, there are left and right output pixels having two phases with respect to pixels (e.g., reference pixels) of the full HD image before up-scaling. Therefore, in the example of FIG. 10, phases are set so that the center of the impulse response obtained by the method illustrated in FIG. 9 overlap two pixels of interest corresponding to the two output pixels, and the filter coefficients (FF1 and FF2 of FIG. 10) corresponding to positions of the reference pixels may be calculated. As the result, a horizontal length from the center of the impulse response to a center of reference pixels corresponding to the target pixel may be the same as that from the center of the target pixel to the center of the reference pixels corresponding to the target pixel.

The gain calculating unit 106 performs the filtering process by selecting a filter with filter coefficient FF1 or a filter with filter coefficient FF2 on the basis of whether the target pixel is the left (e.g., odd-numbered) pixel illustrated in FIG. 10 or is the right (e.g., even-numbered) pixel illustrated in FIG. 10, respectively.

The gain calculating unit 106 may calculate a gain to compensate for phase deviation between the input image signal and enlarged image signal by, for example, filtering using a plurality of filters having different filter coefficients. In addition, the image processing device 100 may replace the enhancement process conducted substantially after up-scaling in the image processing device 10 illustrated in FIG. 1 with an enhancement process based on the input image signal by allowing the gain calculating unit 106 to, for example, perform filtering using the plurality of filters having different filter coefficients.

Figure 11:
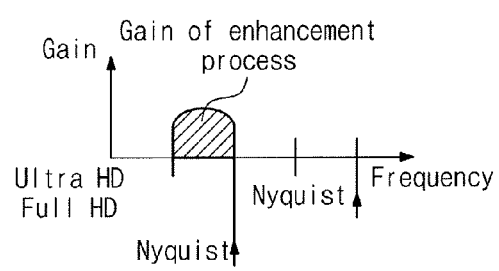
FIG. 11 is an explanatory conceptual diagram illustrating an outline of a process conducted in the image processing device according to an exemplary embodiment of the inventive concept.

Hereinafter, an amplitude characteristic of the filter in the gain calculating unit 106 will be described. FIG. 11 is an explanatory diagram illustrating an outline of a process conducted in the image processing device 100 according to an exemplary embodiment, and schematically illustrates a process in the gain calculating unit 106.

In the image processing device 100, the filter of the gain calculating unit 106 has filter coefficients obtained by sampling, at pixel positions before up-scaling, coefficients of a filter having an impulse response substantially like that in the enhancement process conducted after up-scaling in the image processing device 10 illustrated in FIG. 1. Accordingly, as indicated in FIG. 9, reference letter A, and 11, reference letter A, the filter of the gain calculating unit 106 has a substantially identical amplitude characteristic to that of the filter in the enhancement processing unit 16 illustrated in FIG. 1, but has a difference in Nyquist frequency.

In addition, useful information on the number of filter taps in the gain calculating unit 106 may be gleaned from FIG. 10. In the foregoing example, the filter of the enhancement unit 16 illustrated in FIG. 1 has 9 taps (e.g., the number of taps $T_E=9$) while the filter of the gain calculating unit 106 has 5 taps (e.g., the number of taps $T_{E'}=5$). In other words, when an impulse response substantially identical to that of the filter in the enhancement processing unit 16 is realized in a full HD space corresponding to the resolution of the input image, the number of filter taps of the gain calculating unit 106 does not need to be 9, like the filter of the enhancement processing unit 16 illustrated in FIG. 1. The reason why the number of filter taps of the gain calculating unit 106 does not need to be 9 is that a pixel sampling frequency for the gain calculating process is lowered (e.g., by ½ in the foregoing example). In addition, in the above-described example, the reason why the number of taps $T_{E'}=5$, while the number of taps $T_E=9$, is that the filter coefficients are determined based on the method of FIG. 10.

As to the gain calculating process, for example, the gain calculating unit 106 calculates the gain by filtering using the plurality of filters having different filter coefficients as illustrated in FIG. 10. In addition, the gain calculating process is not limited to the process illustrated in FIG. 10.

Designing an up-scaler is easier when the image processing method according to an embodiment of the inventive concept is used than a case where the basic technique is used.

Figure 12:
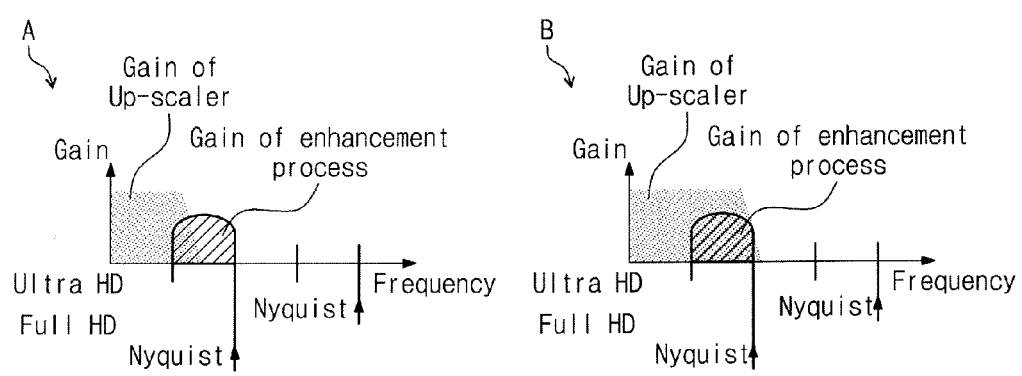
FIG. 12 is an explanatory conceptual diagram for representing that it is difficult to design an up-scaler in the image processing device in which an enhancement process is performed after up-scaling.

FIG. 12 is an explanatory diagram showing that it is difficult to design an up-scaler in the image processing device 10 according to the basic technique in which an enhancement process is performed before up-scaling. FIG. 12, reference letters A and B are graphs showing that the gain of the filter of the up-scaler in the scaling unit 14 and the gain of the filter in the enhancement processing unit 16 are overlapped in the image processing device 10.

FIG. 12, reference letter A, is an example showing that a band of the filter in the up-scaler is limited only to a low band, and in this case, a side effect due to overlapping or superposition may be substantially avoided. When the filter band of the up-scaler is like that shown in FIG. 12, reference letter A, a signal having a frequency higher than a band set in a full HD image, which is an input image, is attenuated by the up-scaler. Accordingly, in a case where the filter band of the up-scaler is like shown in FIG. 12, reference letter A, since there is substantially no signal in a band (e.g., the filter band of the up-scaler and a gain band of the enhancement filter do not overlap) where the enhancement processing unit 16 illustrated in FIG. 1 has a gain, an image may be sufficiently enhanced even though the process in the enhancement processing unit 16 is conducted.

Furthermore, as illustrated in FIG. 12, reference letter B, when an up-scaler is used having a filter band with a gain to a gain band of the enhancement processing unit 16 in FIG. 1, it is possible to sufficiently enhance the image. However, in a case where the filter band of the up-scaler is as illustrated in FIG. 12, reference letter B, since, as the up-scaler, a low pass filter is employed which has a gain to a region in which a Nyquist frequency is exceeded in the input image signal, an overlapping or superposed component might not be removed so degradation in quality of display may occur due to occurrence of ringing.

As described above, in the image processing device 10 according to the basic technique where the enhancement process is conducted substantially after up-scaling, the foregoing may arise by setting a filter band of the up-scaler. Accordingly, in the basic image processing device 10, the level of difficulty in designing the ups-scaler or adjusting performance is high.

However, the image processing device 100 according to an embodiment of the inventive concept does not use the enlarged image signal processed by the scaling unit 104 to calculate the gain, as illustrated in FIG. 5. Accordingly, in the image processing device 100, the scaling unit 104 may use an up-scaler that does not generate an overlapping or super-positioned component as illustrated in FIG. 12, reference letter A, and accordingly prevents such degradation in quality of display of an image represented by an output image signal. Therefore, design and adjustment of the up-scaler may be beneficially facilitated by using the image processing method according to an embodiment of the inventive concept rather than the basic technique.

In addition, in the scaling unit 104, when an up-scaler is used in which the overlapping component is not generated as illustrated in FIG. 12, reference letter A, there may be a loss in high band of the enlarged image signal output from the scaling unit 104. However, since a signal output from the gain calculating unit 106 includes a high band component, and a gain corresponding to a pixel value of the enlarged image is added to each target pixel in the adding unit 108, the quality of image represented by the output image signal is maintained and the image has high resolution with a sufficient high band component.

The image processing device 100 shows, for example, the following effects.

In the image processing device 100, since a recording medium is not necessary for any enhancement process after up-scaling, the size of hardware may be greatly reduced when, in particular, a high resolution image is processed.

In the image processing device 100, since it is not necessary to conduct an enhancement process for the image signal substantially after up-scaling, it is not required to forcedly leave a high band during designing the up-scaler. This further mitigates the level of difficulty in designing the up-scaler.

In the image processing device according to an exemplary embodiment, the scaling process for a case where an up-scale ratio is an integer multiple is exemplified, but the up-scale ratio according to the embodiment is not limited to an integer. For example, an image processing device having an up-scale ratio of 1.5 may be used.

In addition, in an exemplary configuration of the image processing device according to an embodiment, a sequence for setting a filter used for the gain calculating process is substantially identical. Accordingly, description will be provided about the difference, namely, an alternate method for calculating filter coefficients influenced by a change in the up-scale ratio in the scaling process and used in the gain calculating process.

Figure 13:
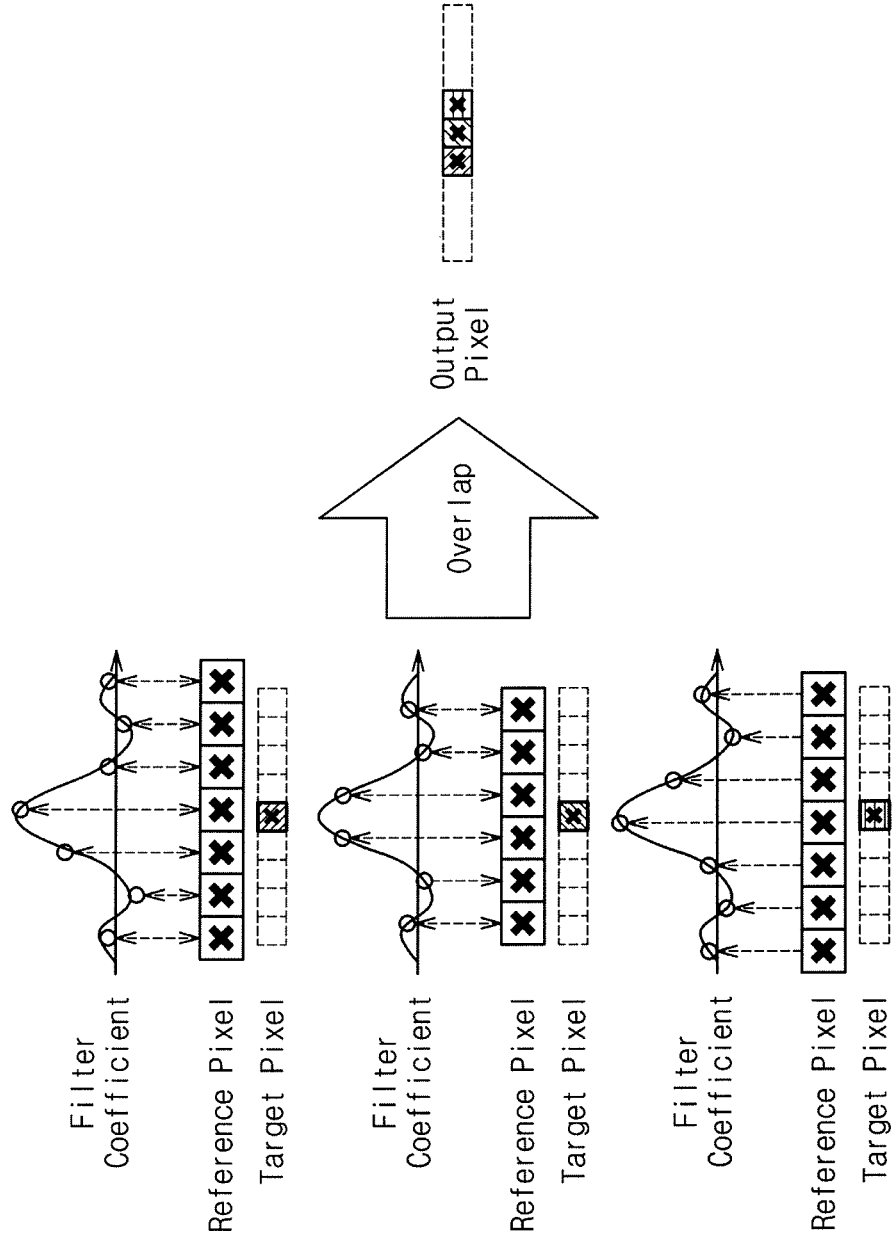
FIG. 13 is an explanatory conceptual diagram illustrating an outline of a process conducted in the image processing device according to an exemplary embodiment of the inventive concept.

FIG. 13 is an explanatory diagram illustrating an outline of a process conducted in the image processing device 100 according this embodiment, and illustrates an exemplary spatial relationship for a reference pixel of an input image with respect to a target pixel corresponding to the gain output from the gain calculating unit in the image processing device.

Since the up-scale ratio (e.g., enlargement ratio of an input image) of the scaling process is different, the spatial relation of a reference pixel of the input image for the target pixel corresponding to the gain output from the gain calculating unit is also different from that illustrated in FIG. 10. In detail, a case where the up-scale ratio is 1.5 in an up-scaling process means that the following three kinds of pixels of interest exist, as illustrated in FIG. 13.

A target pixel whose left end matches with the reference pixels.

A target pixel existing at the center of the reference pixels.

A target pixel whose right end matches with the reference pixels.

Even in the example of FIG. 13, the filter coefficients may be obtained by retarding a phase of an impulse response so that the center of the impulse response overlaps the target pixel, and performing sampling from the phase of the reference pixels. In addition, a gain calculating unit of this exemplary image processing device calculates the gain for emphasizing or enhancing the enlarged image by separately using three kinds of filters whose filter coefficients are different according to a position of the target pixel.

As described above, the image processing device according to this embodiment has a difference in method for calculating the filter coefficients, but has sameness of the configuration of the image processing device or sequence for setting the filter used for the gain calculating process. Accordingly, this exemplary image processing device may show an effect substantially identical to other image processing devices based on the present inventive concept.

Although exemplary cases using up-scale ratios of double and 1.5 have been exemplified for ease of description, the up-scale ratio according to an embodiment is not limited to the above-described concrete examples. In the image processing device according to an embodiment of the inventive concept, it is possible to calculate a gain for emphasizing or enhancing an enlarged image by a filtering process with a plurality of filters having filter coefficients calculated using the same method, that is, using a plurality of filters having difference filter coefficients corresponding to an enlargement ratio of an input image in such scaling process.

Even though an arbitrary up-scale ratio may be used in the scaling process, an image processing device according to an embodiment of the inventive concept may conduct a process according to the image processing method described herein and may show an effect substantially identical to the image processing device 100 of FIG. 1.

As in the foregoing, as an embodiment of the inventive concept, a description is provided about the image processing device, but the embodiment is not limited to this type. Embodiments of the inventive concept may be applied to various devices capable of processing an image signal, such as a computer including a PC or a server, a device in a tablet type, a communication device including a mobile phone or smartphone, a display device including a TV or monitor, or the like.

A program enabling a computer to function as a scaling unit, a gain calculating unit, and/or an adding unit is contemplated for allowing the computer to function as the image processing device according to an embodiment of the inventive concept. The program may be executed by the computer to enable an image represented by an input image signal to be up-scaled and to substantially prevent degradation in quality of display of an up-scaled and enhanced image.

In addition, a program that enables a computer to function as the image processing device according to an embodiment of the inventive concept may be executed in the computer to represent an effect of using the image processing device according to an embodiment of the inventive concept.

Moreover, exemplary embodiments of the inventive concept are described with reference to the accompanying drawings in the foregoing, but embodiments are not limited hereto. Accordingly, it should be understood that numerous other modifications and embodiments may be devised by those of ordinary skill in the pertinent art that will fall within the spirit and scope of the principles of this disclosure.

For example, per the foregoing, a program (e.g., computer program) is contemplated for enabling a computer to function as the image processing device according to an embodiment of the inventive concept, but an embodiment may provide a recording medium with the program recorded thereon.

According to the embodiments of the inventive concept, the image represented by the input image signal may be up-scaled, and degradation in quality of display of the image that is up-scaled and enhanced may be substantially prevented.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description of exemplary embodiments.

What is claimed is:

1. An image processing device comprising:
a scaling unit configured to enlarge an input image represented by an input image signal to generate an enlarged image represented by an enlarged image signal;
a gain calculating unit configured to calculate a gain for enhancing the enlarged image for each target pixel of the enlarged image, respectively, based on the input image signal; and
an adding unit configured to add, for each target pixel of the enlarged image, the gain for the target pixel with a pixel value of the target pixel, respectively,
wherein the gain calculating unit calculates the gain through a filtering process using a plurality of filters corresponding to an enlargement ratio of the scaling unit with respect to the input image, and filter coefficients of the plurality of filters are different from each other.

2. The image processing device of claim 1, wherein the gain calculating unit calculates the gain to compensate for phase deviation between the input image signal and the enlarged image signal.

3. The image processing device of claim 1, wherein the gain calculating unit selects at least one of the plurality of filters based on relative positions of the target pixel and reference pixels corresponding to the target pixel, and calculates the gain by using the selected filter.

4. The image processing device of claim 1, wherein the scaling unit and gain calculating unit are each connected to separate inputs of the adding unit, but the gain calculating unit is not connected to any output of the scaling unit.

5. An image processing device comprising:
a scaling unit configured to enlarge an input image represented by an input image signal to generate an enlarged image represented by an enlarged image signal;
a gain calculating unit configured to calculate a gain for enhancing the enlarged image for each target pixel of the enlarged image, respectively, based on the input image signal; and
an adding unit configured to add, for each target pixel of the enlarged image, the gain for the target pixel with a pixel value of the target pixel, respectively,
wherein the gain calculating unit selects at least one of a plurality of filters based on relative positions of the target pixel and reference pixels corresponding to the target pixel, and calculates the gain by using the selected filter, and
wherein a distance from a center of an impulse response of the selected filter to a center of the reference pixels corresponding to the target pixel is substantially equal to a distance from a center of the target pixel to the center of reference pixels corresponding to the target pixel.

6. An image processing method comprising:
enlarging an input image represented by an input image signal to generate an enlarged image represented by an enlarged image signal;
calculating a gain for enhancing the enlarged image for each target pixel of the enlarged image, respectively, based on the input image signal;
adding, for each target pixel of the enlarged image, the gain for the target pixel to a pixel value of the target pixel, respectively; and
calculating the gain through a filtering process using a plurality of filters corresponding to an enlargement ratio with respect to the input image, wherein filter coefficients of the plurality of filters are different from each other.

7. The image processing method of claim 6, further comprising calculating the gain to compensate for phase deviation between the input image signal and the enlarged image signal.

8. The image processing method of claim 6, further comprising selecting at least one of the plurality of filters based on relative positions of the target pixel and reference pixels corresponding to the target pixel, and calculating the gain by using the selected filter.

9. The image processing method of claim 6, further comprising calculating the gain for enhancing the enlarged image independently of enlarging the input image.

10. An image processing method comprising:
enlarging an input image represented by an input image signal to generate an enlarged image represented by an enlarged image signal;
calculating a gain for enhancing the enlarged image for each target pixel of the enlarged image, respectively, based on the input image signal;
adding, for each target pixel of the enlarged image, the gain for the target pixel to a pixel value of the target pixel, respectively;
selecting at least one of a plurality of filters based on relative positions of the target pixel and reference pixels corresponding to the target pixel, and calculating the gain by using the selected filter; and
selecting a filter with a distance from a center of an impulse response of the filter to a center of the reference pixels corresponding to the target pixel being substantially equal to a distance from a center of the target pixel to the center of reference pixels corresponding to the target pixel.

11. A software product for use in an image processing device having a processor and a memory, the software product comprising computer executable instructions that, when executed by the processor, cause the device to:
enlarge an input image represented by an input image signal from the memory to generate an enlarged image represented by an enlarged image signal;
calculate a gain for enhancing the enlarged image for each target pixel of the enlarged image, respectively, based on the input image signal from the memory; and
add, for each target pixel of the enlarged image, the gain for the target pixel to a pixel value of the target pixel, respectively; and
give instructions to calculate the gain through a filtering process using a plurality of filters corresponding to an enlargement ratio with respect to the input image, wherein filter coefficients of the plurality of filters are different from each other.

12. The software product of claim 11, further comprising instructions to calculate the gain to compensate for phase deviation between the input image signal and the enlarged image signal.

13. The software product of claim 11, further comprising instructions to select at least one of the plurality of filters based on relative positions of the target pixel and reference pixels corresponding to the target pixel, and calculate the gain by using the selected filter.

14. The software product of claim 11, further comprising instructions to calculate the gain for enhancing the enlarged image independently of enlarging the input image.

15. A software product for use in an image processing device having a processor and a memory, the software product comprising computer executable instructions that, when executed by the processor, cause the device to:
enlarge an input image represented by an input image signal from the memory to generate an enlarged image represented by an enlarged image signal;
calculate a gain for enhancing the enlarged image for each target pixel of the enlarged image, respectively, based on the input image signal from the memory;
add, for each target pixel of the enlarged image, the gain for the target pixel to a pixel value of the target pixel, respectively;
give instructions to select at least one of the plurality of filters based on relative positions of the target pixel and reference pixels corresponding to the target pixel, and calculate the gain by using the selected filter; and
give instructions to select a filter with a distance from a center of an impulse response of the filter to a center of the reference pixels corresponding to the target pixel substantially equal to a distance from a center of the target pixel to the center of reference pixels corresponding to the target pixel.

* * * * *